Aug. 6, 1940.　　　　　A. C. BYRNS　　　　2,210,542
PROCESS OF REMOVING PHENOLS FROM MINERAL OILS
Filed Dec. 10, 1938
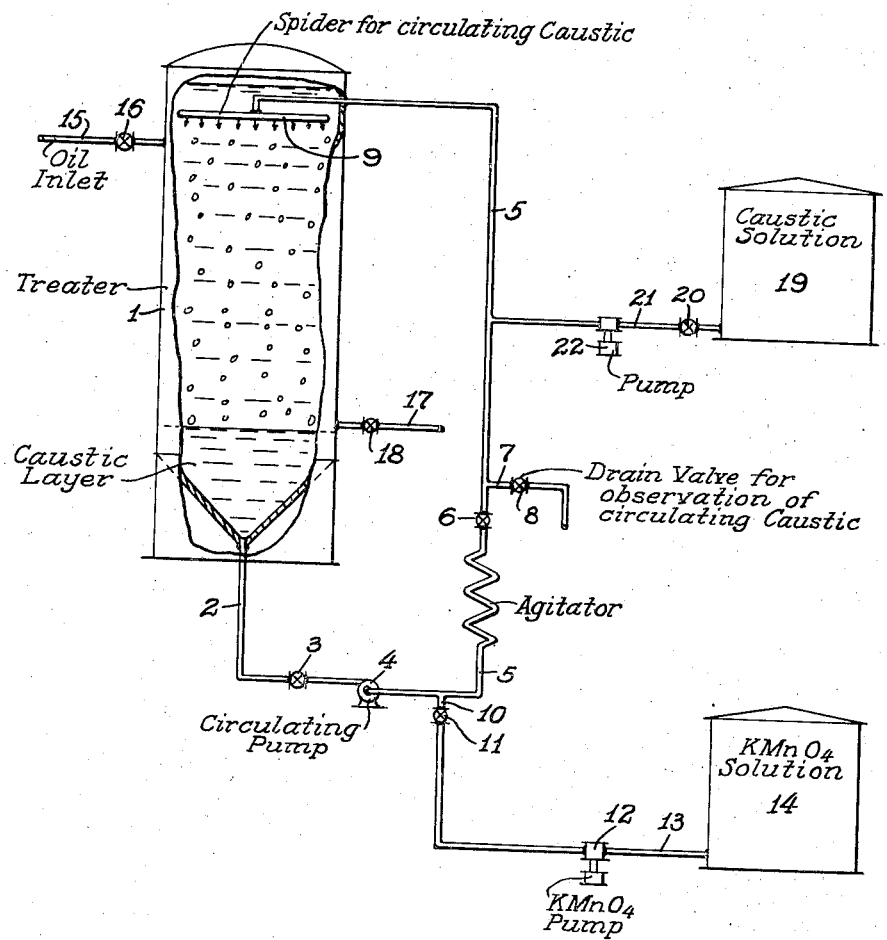
INVENTOR.
Alva C. Byrns
BY Philip Subkow
ATTORNEY.

Patented Aug. 6, 1940

2,210,542

UNITED STATES PATENT OFFICE 2,210,542

PROCESS OF REMOVING PHENOLS FROM MINERAL OILS

Alva C. Byrns, Los Angeles, Calif., assignor to Union Oil Company of California, Los Angeles, Calif., a corporation of California Application December 10, 1938, Serial No. 244,964

4 Claims. (Cl. 196—41)

This invention relates to a method of removing impurities from hydrocarbon fractions. More specifically it relates to a method of removing phenols or phenol-like bodies from hydrocarbon oil fractions.

In the preparation of certain low-boiling solvents from hydrocarbon oil fractions, it is customary to mix the fraction with a selective solvent, such as sulphur dioxide, aniline, nitrobenzene, furfural, phenol or dichloroethylether in order to separate the more paraffinic from the less paraffinic material. The phase which remains undissolved in the solvent is composed chiefly of the more paraffinic fractions of the oil. The oils which are dissolved in the solvent and which make up the extract phase are the relatively non-paraffinic oil fractions contained in the original oil. After the two phases formed by the above extraction are decanted away from each other, they are separated from the solvent by fractional distillation.

The less paraffinic oil fractions recovered from the extract phase are usually rich in hydrocarbons of an aromatic nature and for that reason may be substituted for many uses for which benzol, or its homologues, are employed. In particular, the low boiling aromatic fractions recovered from petroleum, and especially from asphalt base petroleum, are valuable as solvents and thinners in the preparation of paints and lacquers providing they have been sufficiently refined to remove impurities which would impair the drying qualities of said paints and lacquers.

Many of the low boiling hydrocarbon fractions produced from asphalt base crudes are unsuitable as solvents and thinners because they contain impurities, such as phenols and phenol-like bodies, which hinder the drying properties of paints or lacquers in which said hydrocarbon fractions have been incorporated. These phenols or phenolic materials have also been found to impair the drying qualities of drying oils, such as are present in paint, and to which drying accelerators, such as cobalt salts, have been added. Therefore, in order to produce premium low boiling solvents and thinners from asphalt base crude oils, it is important that the content of phenolic bodies in the hydrocarbon fractions be reduced to a point where the drying qualities of the paints and lacquers in which they have been incorporated are not impaired.

In the present refinery production of solvents from relatively aromatic hydrocarbon fractions containing phenolic materials, it is customary to wash the solvent with a strong solution of caustic soda which materially aids in lowering the phenolic content of the oil. However, it is not practicable to remove all or substantially all of the phenols from such hydrocarbon fractions by caustic soda alone since the distribution ratio of said phenolic materials between the caustic soda and hydrocarbon phases is such that excessively large volumes of caustic soda solution would be required and the caustic soda would be very inefficiently used.

I have discovered that the phenols and phenolic bodies may be removed from petroleum fractions by a method in which relatively small amounts of caustic soda or other alkali are used for the treatment. According to my process, the hydrocarbon fraction containing the said phenols and phenol-like compounds is commingled with the aqueous caustic soda solution. During this treatment, a portion of the phenolic compounds becomes dissolved in the caustic soda solution which is subsequently separated from the treated hydrocarbon phase and admixed with an oxidizing agent such as potassium permanganate, hydrogen peroxide, potassium dichromate, etc. The oxidizing agent converts the phenols and phenolic bodies into compounds which are highly soluble in the caustic soda and relatively insoluble in the hydrocarbon fraction. The treated caustic soda is then again mixed with the hydrocarbon oil fraction in order to remove further quantities of the said phenolic compounds. The cycle employed is therefore as follows:

The hydrocarbon oil fraction, containing phenolic bodies, is first treated with an alkali thereby dissolving a portion of the phenolic bodies. The alkali solution is then subjected to an oxidation treatment to convert the said phenolic materials present in the caustic into compounds of relatively greater solubility in the alkali solution and of relatively less solubility in the hydrocarbon fraction, after which the treated alkali solution is further contacted with the hydrocarbon fraction for further removal of phenolic materials.

It is, therefore, an object of my invention to remove phenols and phenolic materials from hydrocarbon oil fractions by subjecting the oil fraction to treatment with caustic alkali, treating the alkali containing the phenols with an oxidizing agent to convert the phenols into compounds which are relatively more soluble in the alkali solution and then returning the treated caustic alkali for further treatment of the partially dephenolated oil.

My invention can be more fully appreciated by reference to the figure. In the drawing, 1 represents a treater, 19 is a supply tank for the caustic treating solution and 14 is a source of supply for the oxidizing agent. In carrying out the invention according to my process, oil is introduced into the treater 1 through line 15 and valve 16, alkali is introduced into the top of the treater 1 through spider 9 from tank 19 through valve 20, line 21, pump 22 and line 5. After the alkali has passed downward through the body of oil in treater 1, it accumulates in the bottom cone of this treater and is withdrawn through line 2, valve 3 and sent by means of pump 4 into line 5 into agitator 23 where it is thoroughly mixed with an oxidizing agent withdrawn from tank 14 through line 13 and passed by means of pump 12 through valve 11 and line 10 to line 5 and thence into agitator 23. The mixture in agitator 23 then passes through valve 6 and line 5 to spider 9 where it is again used to contact the oil in treater 1. It is preferable that line 5 be of such a length, which will be dependent on the rate of flow through the line and the character of the particular oxidizing agent, that sufficient time will have been allowed for the substantially complete oxidation of the phenolic materials present in the alkali solution before the latter is returned through spider 9 for further treatment of the hydrocarbon phase.

After a thorough dephenolizing treatment, the treated oil in treater 1 is withdrawn through valve 18 and line 17. Line 7, containing valve 8 is a drain line employed for observation of the circulating caustic.

As explained above, the oxidizing agent employed in this system may be potassium permanganate, hydrogen peroxide or potassium dichromate or, in fact, any other oxidizing agent which is effective in the presence of an alkali. For example, it is within the scope of the present invention to blow the alkali solution containing dissolved phenolic bodies with air, preferably in the presence of an oxygen carrier such as manganese dioxide. When potassium permanganate is used, it is desirable that only sufficient of this material be added to the alkali to convert the phenolic substances present into a more soluble form, since an amount in excess of the quantity necessary to oxidize the phenols present tends to produce an oil having a poor color.

Furthermore, under some circumstances, it may be desirable to filter the alkali solution after it has been treated with the potassium permanganate and prior to its introduction into treater 1 in order to remove any precipitated manganese dioxide present in the alkali which would contaminate the treated oil if permitted to flow into the treater. The manganese dioxide present in the alkali may be removed by centrifuging or filtering the alkali after treatment with the potassium permanganate, and just prior to its introduction into treater 1.

As a specific example of carrying out my invention, topped kerosene extract, having a boiling range of approximately 345° F. to 440° F., produced by the extraction of kerosene distillate with liquid sulphur dioxide according to the well known Edeleanu process and subsequent distillate, and containing about 3000 parts per million (p. p. m.) of phenols (by method TM—235) is treated as follows:

This extract fraction is treated first with ten pounds of 98% sulphuric acid per barrel of extract in the usual manner employed in acid-treating oil. This treatment reduces the phenol content of the extract to about 1500 p. p. m. The acid-treated extract is then subjected to treatment with three washes of 1% caustic soda solution using 25% by volume of the 1% caustic solution for each wash. This treatment with caustic lowers the phenol content of the hydrocarbon fraction to about 750 p. p. m.

The partially treated stock is then contacted with 10% by volume of a 2% solution of caustic soda. The caustic soda withdrawn from this treatment is then treated with sufficient saturated solution of potassium permanganate to convert the phenols present in the caustic soda into compounds which are relatively more soluble in aqueous phase. The treated caustic soda is then returned again to the treater where it is contacted with the hydrocarbon phase for further removal of the phenols present. After the second treatment, the caustic soda is again treated with a further quantity of potassium permanganate and again returned to treater 1 for retreatment of the oil. This cycle is continuously maintained until the phenol content of the oil in the treater is reduced to the desired value. The consumption of potassium permanganate in the oxidation of the phenols present in the caustic soda is estimated to be about four times the initial phenol content of the solvent. For a content of 750 p. p. m. of phenols in the hydrocarbon, 0.3% of potassium permanganate would be required or about 5% of a 6% solution of potassium permanganate. This represents approximately one pound of potassium permanganate per barrel of the particular solvent stock.

The treated oil recovered according to the preceding example contained about twenty parts per million of phenols and was subsequently redistilled to the desired boiling point.

As a second example, two gallons of topped kerosene extract having a boiling range between 330–440° F. and containing about 2240 p. p. m. of phenols as determined by method TM—235, were treated with ten pounds of 98% sulphuric acid per barrel, agitated five minutes, allowed to settle thirty minutes, decanted, filtered and washed with 10% by volume of 1% caustic soda. The resulting crude solvent contained 1300 p. p. m. of phenols.

The crude solvent was then washed with 10% by volume of 2% caustic soda. The caustic soda from this treatment was mixed with sufficient saturated solution of potassium permanganate to produce a green manganate color which persisted throughout fifteen minutes of agitation of the oil with the caustic soda. The consumption of potassium permanganate by this treatment was 1.6 pounds per barrel of the oil. The oil dephenolated by this method was found to contain 19 p. p. m. of the phenols. A heart cut (18 to 81% by volume of the total distillate) was obtained by distillation and found to contain about 25 p. p. m. of phenols. The color of this oil was 22 Saybolt and was improved to 24 Saybolt on treatment with 1 pound coenite clay per barrel. The physical properties of this final product were as follows:

| | |
|---|---|
| Gravity, °A. P. I. at 60° F | 31.1 |
| Engler distillation, °F.: | |
| Initial boiling point | 372 |
| 10% | 379 |
| 20% | 383 |
| 30% | 386 |
| 40% | 388 |
| 50% | 390 |
| 60% | 393 |
| 70% | 396 |
| 80% | 400 |
| 90% | 405 |
| 95% | 410 |
| Dry | 415 |
| Maximum | 418 |
| Recovery, per cent by volume | 98.5 |
| Phenols, method TM—235, p. p. m | 25 |
| Aniline point, modified 50/50, °C | 32.2 |
| Aromatics (solubility in 99% $H_2SO_4$), per cent by volume | 66 |
| Flash point, Tag., °F | 149 |
| Color, Saybolt | +24 |
| Copper strip corrosion at 360° F | Pass |

In the two foregoing examples I have described the treatment of the mineral oil with weak caustic solutions containing 1% and 2% of sodium hydroxide, respectively. I find it desirable to use weak caustic because it has a higher solubility for sodium phenolate than strong caustic or strong alkali solutions. I find that in most instances a caustic soda solution containing the 1% to 2% sodium hydroxide is highly satisfactory in the process, however, I may use caustic soda solutions containing, for example, 10% sodium hydroxide or even higher. It is also to be understood that while I have described the use of sodium hydroxide in my process, other caustic alkalies, such as potassium hydroxide, may also be used.

In the two foregoing examples, I have described the removal of phenols from oils which have been given a previous acid treatment. It is to be understood, however, that the process is not limited to the removal of phenols from acid-treated oils, since the process is readily adapted to the removal of phenols from oils which have been given no previous treatment by acid, or by any other treating agents.

Throughout the specification, I have referred to the phenol content both prior to treatment and after treatment. The method which I have employed to determine the phenol content of these oils is designated in this specification as TM-235, and has been developed by the du Pont Company to determine the presence and amount of such phenolic compounds as phenol, cresol, guaiacol and related materials in hydrocarbon solvents. The method is based on an article by Stoughton, J. Biol. Chem., 115, 293 (1936). The method depends on the formation of yellow colored nitroso compounds by treatment of an acetic acid solution of the phenol with nitric and sulphuric acid. The intensity of the color produced in alkaline solution is compared with a standard (p-tertiary butyl phenol) prepared in the same way.

A 25 cc. sample of the hydrocarbon solvent is treated in a separatory funnel in several successive extractions with 25 cc. of 0.2 normal KOH, treating each extraction as directed below, until further extractions yield no color.

Each extraction is placed in a 100 cc. volumetric flask, neutralized with 25 cc. of 0.2 normal $H_2SO_4$, and then diluted to the 100 cc. mark with glacial acetic acid. To 50 cc. of this solution placed in a 125 cc. Erlenmeyer flask is added 6 drops of concentrated $H_2SO_4$ and 6 drops of concentrated $HNO_3$. The mixture is then heated on a steam bath until a pale yellow color develops and reaches a maximum (5-30 min.). The remaining 50 cc. is treated in like manner as a check. Cool, then carefully make slightly alkaline with concentrated ammonium hydroxide (about 35 cc.). Dilute to 100 cc. with water and compare in a colorimeter with a standard prepared as follows:

Place 25 cc. of a standard phenol solution, prepared by dissolving freshly distilled phenol or p-tertiary butyl phenol in distilled water, and containing 60 parts per million, in a 100 cc. volumetric flask. Add 25 cc. of distilled water and dilute to the mark with glacial acetic acid. To 55 cc. of this solution add 6 drops of concentrated $H_2SO_4$ and 6 drops of concentrated $HNO_3$. Heat on a steam bath, neutralize and dilute to 100 cc. as described above.

The phenol content of the sample in parts per million is equal to the colorimeter reading of the standard multiplied by the colorimeter reading of the sample divided by the phenol content of the standard in parts per million.

The calculated phenol contents of each of the several extractions are added to give the total phenol content of the solvent, expressed as parts per million of the particular phenol used as a standard.

The method described in conjunction with the sketch is essentially a batch process. It is to be understood that I do not wish to limit myself by the process shown in this sketch since, in this sketch, I may carry out the process by feeding the oil to be treated into the bottom of a treating column and then feed the alkali into the top of the treating column, withdraw treated oil from the top of this column and withdraw alkali, containing phenols, from the bottom of the column, which may be subjected to the oxidizing treatment described above in conjunction with the batch process and then returned to the treating cycle.

I claim:

1. A process of removing phenols from mineral oil which comprises agitating said oil with an alkali containing an oxidizing agent selected from the class consisting of potassium permanganate, potassium dichromate and hydrogen peroxide to convert the phenols into compounds which are relatively more soluble in said alkali solution and separating the mineral oil from the alkali.

2. A process of removing phenols from mineral oil which comprises agitating said oil with an alkali containing potassium permanganate to convert the phenols into compounds which are soluble in said alkali solution and separating the mineral oil from the alkali.

3. In the process of treating mineral oil for the removal of phenols therefrom, which process comprises contacting said oil with an aqueous alkali solution, separating the aqueous alkali solution from the mineral oil and retreating said mineral oil with said separated aqueous alkali solution, the step of contacting the aqueous alkali solution separated from said mineral oil with an oxidizing agent selected from the class consisting of potassium permanganate, potassium dichromate and hydrogen peroxide.

4. In the process of treating mineral oil for the removal of phenols which process comprises contacting said oil with an aqueous alkali solution to convert the phenols present in said oil into phenolates, removing the aqueous alkali solution containing phenolates dissolved therein from the mineral oil, contacting the aqueous alkali solution containing dissolved phenolates with an oxidizing agent to convert said phenolates into compounds which are relatively more soluble in said aqueous alkali than said phenolates and then treating mineral oil containing phenols with said alkali which has been treated with said agent, the step of treating said aqueous alkali solution containing said phenolates with an oxidizing agent selected from the class consisting of potassium permanganate, potassium dichromate and hydrogen peroxide.

ALVA C. BYRNS.